W. M. TYRE.
PLOW.
APPLICATION FILED SEPT. 21, 1914.

1,184,053.

Patented May 23, 1916.

Witnesses

Inventor
W. M. TYRE
By Watson E. Coleman
Attorney

UNITED STATES PATENT OFFICE.

WILLIAM M. TYRE, OF LAKE CITY, FLORIDA.

PLOW.

1,184,053.  Specification of Letters Patent.  Patented May 23, 1916.

Application filed September 21, 1914. Serial No. 862,762.

*To all whom it may concern:*

Be it known that I, WILLIAM M. TYRE, a citizen of the United States, residing at Lake City, in the county of Columbia and State of Florida, have invented certain new and useful Improvements in Plows, of which the following is a specification, reference being had to the accompanying drawings.

This invention relates to new and useful improvements in plows and more particularly to a plow whereby a greater amount of soil may be loosened than by the use of the single plow member of the general character, the main object of the present invention being the provision of a plow which includes two plow members, one arranged in the rear of the other and out of alinement so that two furrows may be turned at one time, instead of one furrow, as is generally the case with a number of plows in use at the present time.

Another object of the present invention is the provision of a plow wherein the plow member which is arranged in spaced relation with the plow beam, is securely held in rigid position against lateral or longitudinal movement and which, at the same time, can be quickly and readily detached from the plow beam or attached thereto.

A further object of the present invention is the provision of a plow of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

Figure 1:
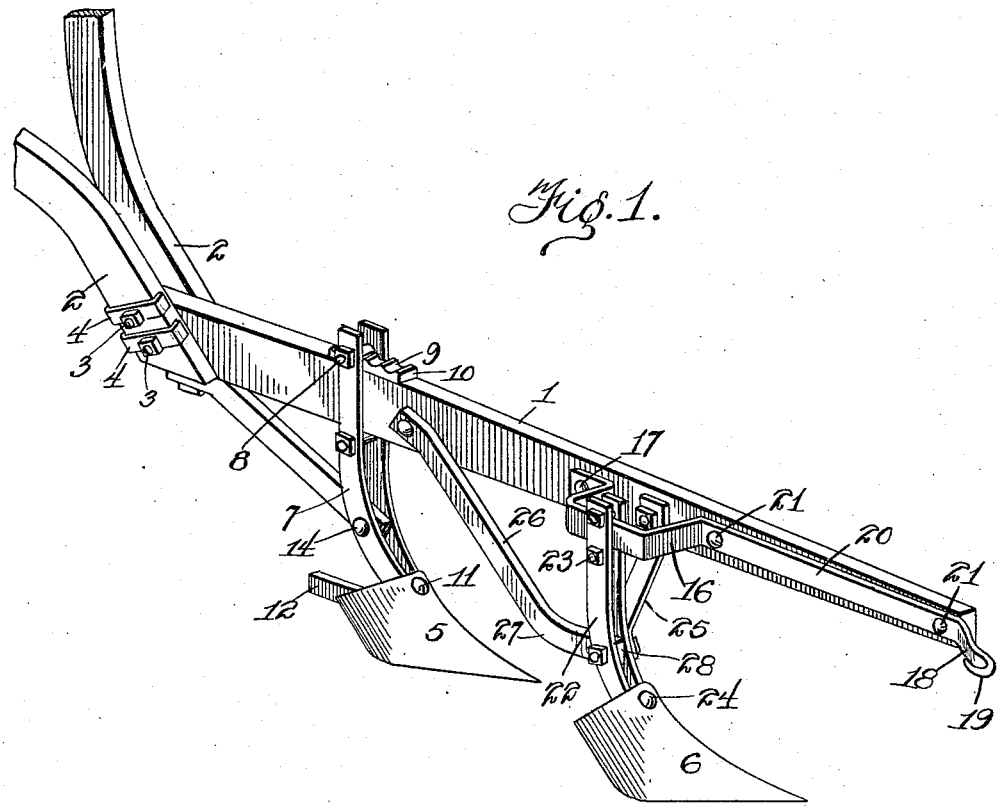
Figure 2:

In the accompanying drawing forming a part of this application, Figure 1 is a detail perspective view of a plow constructed in accordance with my invention; and Fig. 2 is a detail perspective view illustrating a slightly modified form of plow blade.

Referring more particularly to the drawing, 1 indicates the plow beam, to the inner end of which is secured the divergent handle members 2, said handle members being rigidly secured to the beam by means of the transverse bolts 3. In order to prevent the inner ends of the handle members from splitting or slivering, I provide the U-shaped clips 4 arranged upon the inner end of the handles and securely held in position by means of the bolts 3. The plow members are generally indicated by the numerals 5 and 6, the plow member 5 being supported in a rigid position beneath the plow beam 1 by means of the U-shaped member 7, the ends of which are arranged in spaced parallel relation and disposed upon opposite sides of the plow beam. The ends of the member 7 are securely clamped to the plow beam by means of the transverse bolts 8, the bolt upon the upper side of the beam being extended transversely through one of the grooves 9 in the bearing plate 10. The plow member 5 is rigidly secured to the lower end of the member 7 by means of the bolt 11 and secured to the lower end of the U-shaped member 7 and extending rearwardly therefrom, is a supporting foot 12.

The U-shaped member 7, which supports the plow 5, is securely held against longitudinal movement with respect to the beam 1 by means of a rigid brace bar 13, the lower end of which is arranged between the arms of the member 7 and securely retained therein by means of the transverse bolt 14, while the upper end thereof is arranged along the under side of the beam 1 and securely held in position by means of the bolt 15. In order to support the plow member 6 in spaced relation from the beam 1, a U-shaped bracket 16 is secured to the side of the plow beam, one end of which is bolted to the plow beam by means of the bolts 17, the other end extending parallel with the plow beam, forwardly to the outer end thereof, thence bent diagonally, as shown at 18 and provided at its outer end with a hook 19, whereby the whiffle-trees may be readily connected with the plow beam and it will be noted that the extended end 20 of the bracket 18 is rigidly secured to the plow beam by means of the bolts 21. It will be noted that the plow 6 is suspended or supported beneath the bracket 16 by means of a U-shaped member 22, said member having its ends disposed upon opposite sides of the intermediate portion of the bracket 16 and securely clamped thereto by means of the bolts 23.

The plow member 6 is rigidly secured to the lower end of the member 22 by means of the bolt 24 which extends transversely through the plow member and through the lower end of the supporting member 22 and provided with a removable nut whereby the plow members may be quickly and readily attached to the lower end of the member 22 or removed therefrom. The supporting member 22 is retained in spaced relation with the plow beam and securely held against lateral movement by means of a diagonal brace member 25, the upper end of which is arranged along the side of the plow beam and bolted or otherwise secured thereto, while the lower end is arranged alongside of the member 22 at the lower end thereof and bolted or otherwise secured thereto. From this it will be apparent that the brace member 25 will rigidly retain the member 22 against any lateral movement, either toward or away from the plow beam.

The member 22 is securely retained against longitudinal movement by means of a diagonal brace member 26, the upper end of which is arranged alongside of the plow beam 1 and bolted or otherwise secured thereto while the other end extends outwardly at an angle with respect to the plow beam and is bent, as shown at 27 so that it can be readily disposed between the side portions of the member 22 and bolted or otherwise secured thereto, as shown at 28. From this it will be apparent that the plow member 6 is arranged directly in front of the plow member 5 and, at the same time, is disposed out of alinement therewith or arranged in spaced relation with the plow beam 1, so that two furrows of earth can be readily turned at one time, instead of one. It will be noted that by having the extended end 20 of the bracket 16 arranged alongside of the forward end of the plow beam 1, it will rigidly retain the bracket 16 in its effective position and support the plow member 6 in spaced relation with the beam and, at the same time, provide means whereby the whiffle-trees or other draft means may be readily applied to the plow beam.

While I have described this device as preferably used as a plow, it will be understood that the same may be used as a cultivator for cultivating between rows of growing plants such as cotton, corn and the like and, in Fig. 2 I have illustrated, substantially cultivator shovels 29 which may be used in place of the plow members 5 and 6, when so desired and it is to be understood that any form of cultivator shovel, plow or other soil working tool may be applied to the lower ends of the supporting members 7 and 22. It will also be apparent that my invention is extremely simple in its construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claim.

Having thus described this invention, what I claim is:—

In combination with a plow beam, an elongated member secured to a side face of the beam and disposed longitudinally thereof, the inner end portion of the member being offset, the forward end portion of the member extending in advance of the forward end of the beam and being formed into a clevis engaging hook.

In testimony whereof I hereunto affix my signature in the presence of two witnesses.

WILLIAM M. TYRE.

Witnesses:
J. E. BATTLE,
H. M. PARRISH.

Copies of this patent may be obtained for five cents each, by addressing the "Commissioner of Patents, Washington, D. C."